US011858099B2

(12) United States Patent
Lamb

(10) Patent No.: US 11,858,099 B2
(45) Date of Patent: Jan. 2, 2024

(54) CLINCH STAPLE MECHANISM

(71) Applicant: PNEUTOOLS, INC., Arlington, TN (US)

(72) Inventor: Frederick William Lamb, McDonald, PA (US)

(73) Assignee: PneuTools, Inc., Arlington, TN (US)

( * ) Notice: Subject to any disclaimer, the term of this patent is extended or adjusted under 35 U.S.C. 154(b) by 88 days.

(21) Appl. No.: 16/747,648

(22) Filed: Jan. 21, 2020

(65) Prior Publication Data

US 2020/0230792 A1 Jul. 23, 2020

Related U.S. Application Data

(60) Provisional application No. 62/794,003, filed on Jan. 18, 2019.

(51) Int. Cl.
*B25C 5/02* (2006.01)
*B25C 5/13* (2006.01)

(52) U.S. Cl.
CPC .............. *B25C 5/0207* (2013.01); *B25C 5/13* (2013.01)

(58) Field of Classification Search
CPC ....... B25C 5/0207; B25C 5/0278; B25C 5/13; B25C 5/02; B25C 5/1603; B25C 7/00; B27F 7/04; B27F 7/19
See application file for complete search history.

(56) References Cited

U.S. PATENT DOCUMENTS

| | | | | | |
|---|---|---|---|---|---|
| 212,316 | A | * | 2/1879 | McGill | B27F 7/19 227/155 |
| 985,103 | A | * | 2/1911 | Baum | B21D 1/14 72/457 |
| 1,956,174 | A | | 4/1934 | Maynard | |
| 2,046,359 | A | * | 7/1936 | Babcock, Jr. | B27M 3/36 29/505 |
| 2,687,522 | A | * | 8/1954 | Juilfs | B25C 5/13 227/124 |
| 2,943,327 | A | | 7/1960 | Juilfs | |

(Continued)

FOREIGN PATENT DOCUMENTS

| | | | | | |
|---|---|---|---|---|---|
| CH | 340043 | A | * | 7/1959 | B27F 7/19 |
| DE | 447735 | C | * | 7/1927 | B25C 5/0207 |

(Continued)

OTHER PUBLICATIONS

International Search Report and Written Opinion for International Application No. PCT/US20/20091 dated Nov. 27, 2020.

(Continued)

*Primary Examiner* — Joshua G Kotis
(74) *Attorney, Agent, or Firm* — Reed Smith LLP

(57) ABSTRACT

A clinch staple mechanism including a pivoting base configured to be pivotally connected to a pneumatic stapling tool. The pneumatic stapling tool is configured to dispense staples each staple having a crown and a pair of staple legs, wherein the crown is disposed in a crown direction. The clinch staple mechanism further includes a clinch arm pivotally connected to the pivoting base at a proximal end of the clinch arm; and a clinch block disposed on a distal end of the clinch arm, wherein the clinch block is configured to bend the staple legs in a direction perpendicular to the crown direction.

8 Claims, 6 Drawing Sheets

(56) References Cited

U.S. PATENT DOCUMENTS

| | | | |
|---|---|---|---|
| 3,734,378 A | 5/1973 | Rice et al. | |
| 3,871,227 A * | 3/1975 | Tidwell, Jr. | B27F 7/04 72/476 |
| 3,900,144 A * | 8/1975 | Hamilton | B25C 7/00 227/155 |
| 4,011,785 A | 3/1977 | Schrepferman | |
| 4,340,331 A | 7/1982 | Savino | |
| 5,004,142 A | 4/1991 | Olesen | |
| 5,350,400 A * | 9/1994 | Esposito | A61B 17/0686 606/219 |
| 5,360,305 A | 11/1994 | Kerrigan | |
| 6,056,183 A | 5/2000 | Tanabe | |
| 6,059,504 A | 5/2000 | Ishida et al. | |
| 6,237,827 B1 | 5/2001 | Reckelhoff | |
| 6,431,428 B1 | 8/2002 | Chen | |
| 6,877,646 B2 * | 4/2005 | Paynter | B21J 15/025 227/120 |
| 7,556,183 B1 | 7/2009 | Liang et al. | |
| 9,993,913 B2 | 6/2018 | McCardle et al. | |
| 2004/0031839 A1 | 2/2004 | Pruyne | |
| 2006/0071047 A1 | 4/2006 | Aguirre et al. | |
| 2009/0159633 A1 | 6/2009 | Wu | |
| 2014/0076954 A1 | 3/2014 | Miller et al. | |
| 2014/0209657 A1 | 7/2014 | Huang et al. | |
| 2017/0297188 A1 * | 10/2017 | Huang | B25C 7/00 |
| 2018/0168598 A1 * | 6/2018 | Shelton, IV | A61B 17/07207 |
| 2018/0354112 A1 | 12/2018 | Huang et al. | |
| 2019/0329391 A1 * | 10/2019 | Huang | B25C 7/00 |

FOREIGN PATENT DOCUMENTS

| | | | |
|---|---|---|---|
| FR | 1397370 A * | 4/1965 | B25C 5/0257 |
| SU | 1007980 A1 * | 3/1983 | |
| SU | 1418033 A1 * | 8/1988 | |

OTHER PUBLICATIONS

"Polyamide Fibers (Nylon)" (Polymer Properties Database(online) (retrieved from the internet on Nov. 6, 2020: https://web.archive.org/web/20170311172258/https://polymerdatabase.com/Fibers/Nylon.html. Mar. 11, 2017; entire document, especially paragraph 3.

International Search Report and Written Opinion for corresponding International Application No. PCT/US20/27956 dated Jul. 24, 2020.

Search Report and Written Opinion for corresponding International Application No. PCT/US20/14321 dated Apr. 29, 2020.

Search Report and Written Opinion for European Application No. 20741211 dated Sep. 8, 2022.

* cited by examiner

CLINCH STAPLE MECHANISM

CROSS-REFERENCE TO RELATED APPLICATION

This application claims the benefit under 35 U.S.C. § 119(e) of the earlier filing date of U.S. Provisional Patent Application No. 62/794,003 filed on Jan. 18, 2019, the disclosure of which is incorporated by reference herein.

BACKGROUND

Exemplary embodiments disclosed herein relate to clinch staple mechanisms. Clinch staples are typically used to fasten two wood pieces together. For example, a pallet may be formed from wood pieces such as deck boards and stringer boards fastened together by clinch staples where the deck boards and stringer boards intersect. Typical clinch staple mechanisms in the industry only clinch in a direction parallel to the crown of the staple, or they are clinched in an uncontrolled manner.

BRIEF DESCRIPTION OF THE DRAWINGS

Various embodiments of the disclosure are described herein in by way of example in conjunction with the following figures, wherein like reference characters designate the same or similar elements.

DETAILED DESCRIPTION

Figure 1:
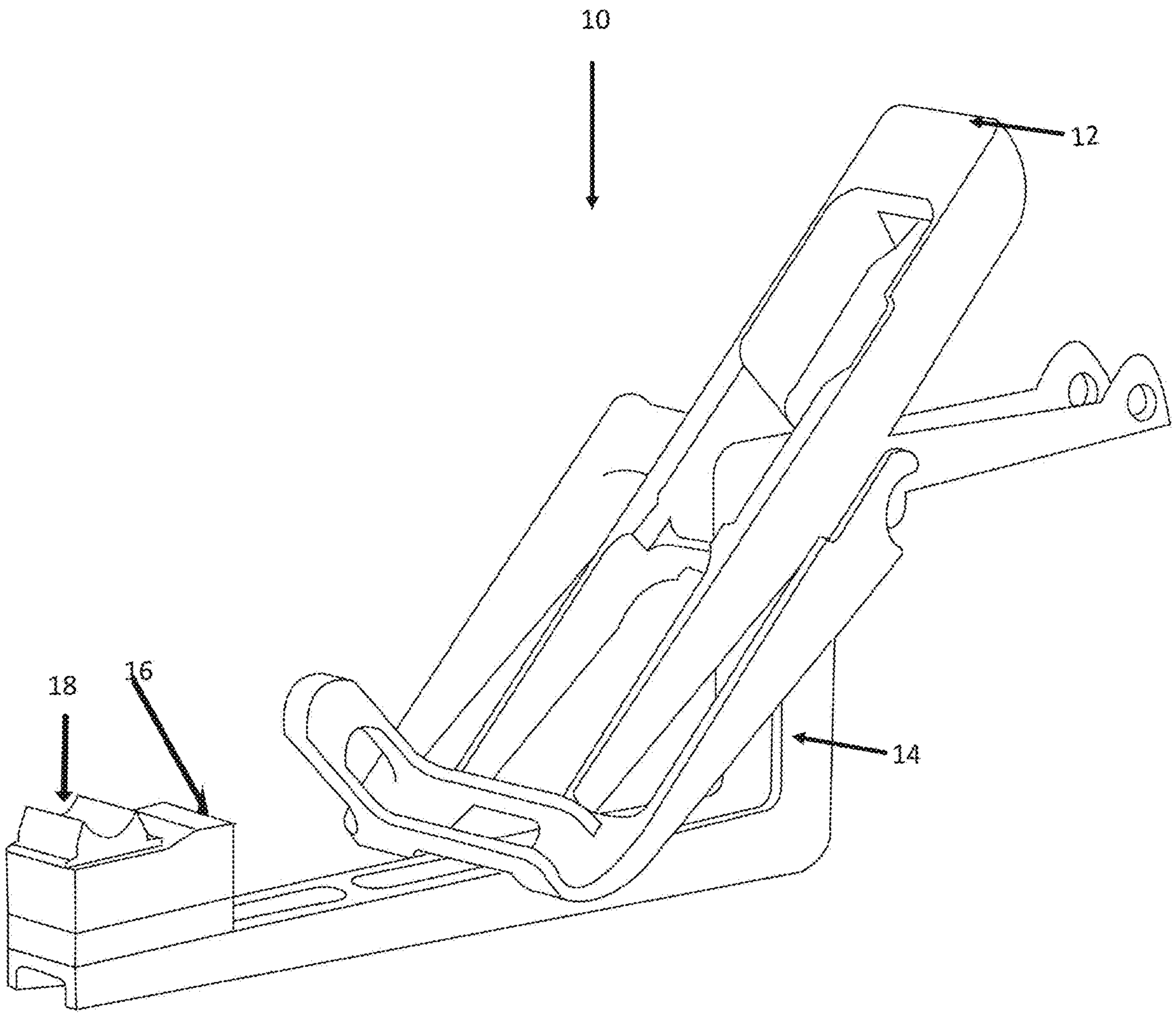
FIG. 1 is a perspective view of a clinch staple mechanism according to embodiments of the disclosure.

Referring to FIGS. 1-6, a clinch staple mechanism 10 according to the exemplary embodiments of the disclosure is a piece of equipment for attaching to pneumatic stapling tools 11. Clinch staple mechanism 10 includes a pivoting base 12 for the pneumatic stapling tool 11 to attach to, a clinch arm 14 that holds a clinch block 18 on a distal end 31 of clinch arm 14. Pneumatic stapling tool 11 is pivotally connected to pivoting base 12 at pivoting base pivot point 21. Clinch arm 14 is pivotally connected at a proximal end 33 thereof to pivoting base 12 at clinch arm pivot point 13. Clinch block 18 may be supported on clinch arm 14 by a clinch block base 16. Clinch block 18 has a pair of staple leg tracks 20 in the form of parallel grooves for the guiding of staples in a particular direction relevant to the orientation of the wood grain of the wood being clinched. Exemplary embodiments of this disclosure allow for the clinching of two pieces of wood such as a top deck board 32 and a stringer board 34 whose wood grain orientations are opposite or perpendicular to one another. As shown by example in FIG. 6, a pallet 30 may include top deck boards 32 and stringer boards 34. Top deck boards 32 may have a wood grain direction A which is perpendicular or opposite to a wood grain direction B of stringer boards 34.

Figure 2A:
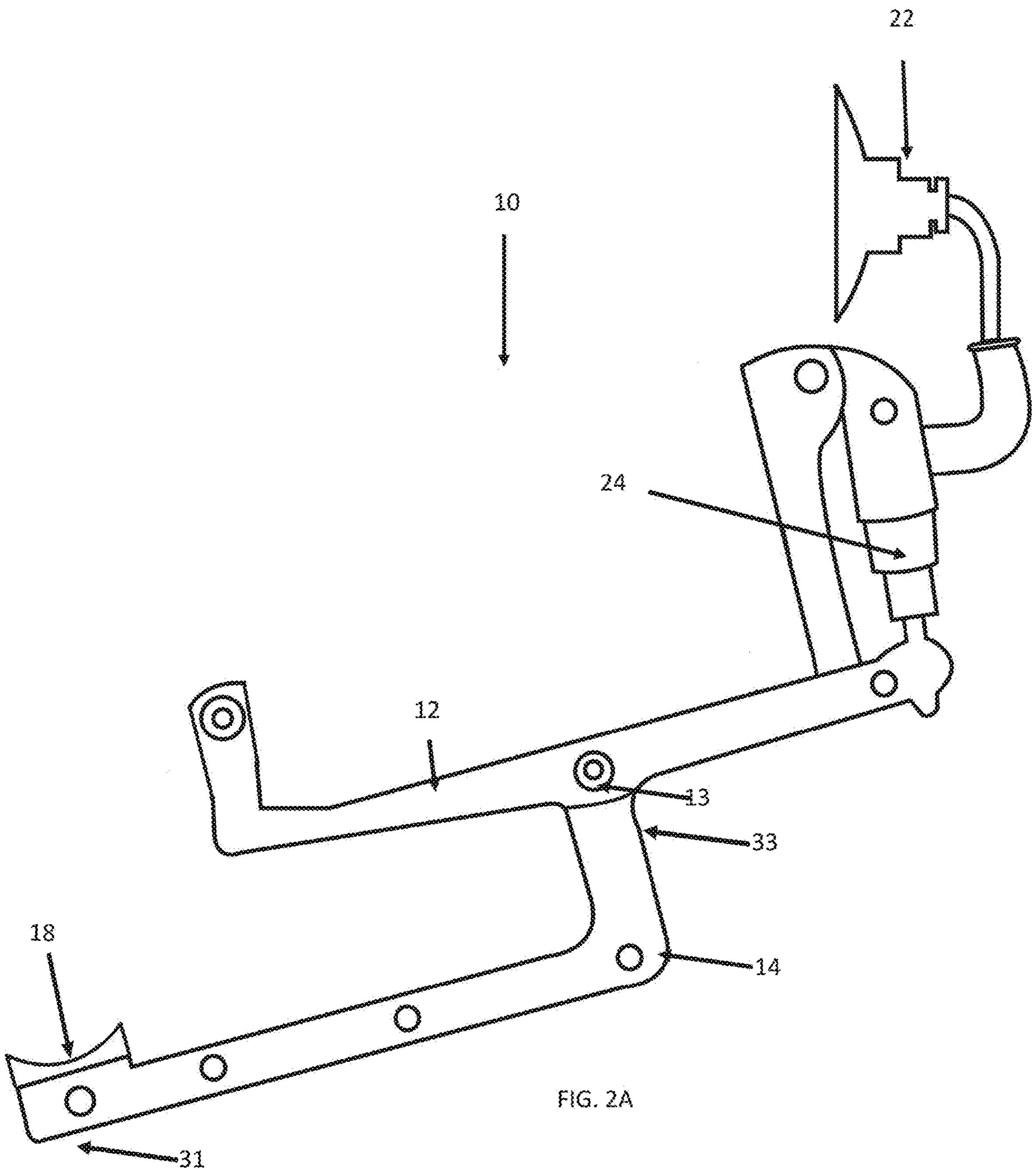
FIG. 2A is a side view of a clinch staple mechanism according to embodiments of the disclosure shown without a pneumatic stapling tool.
Figure 2B:
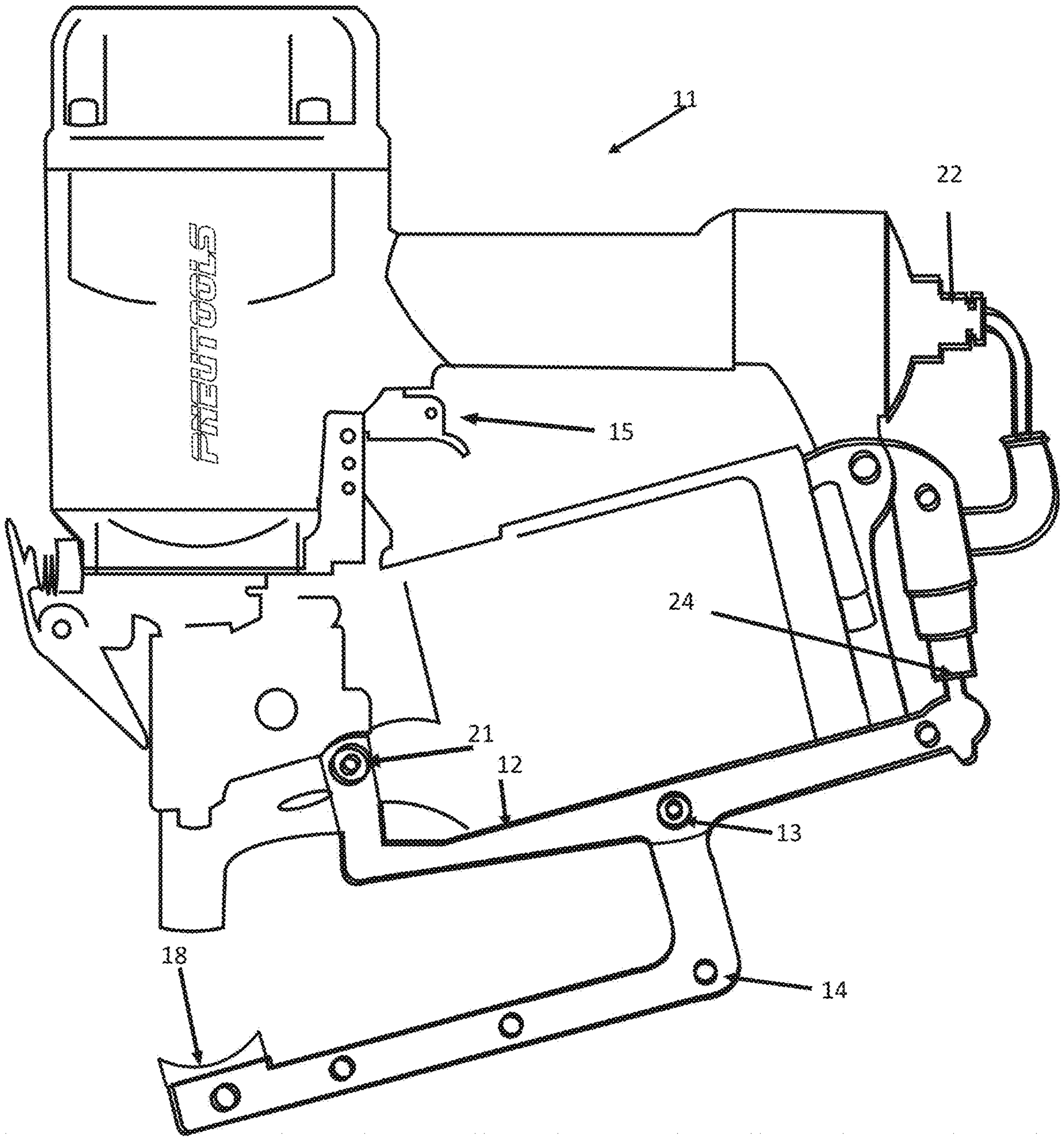
FIG. 2B is a side view of a clinch staple mechanism according to embodiments of the disclosure shown with a pneumatic stapling tool.
Figure 3:
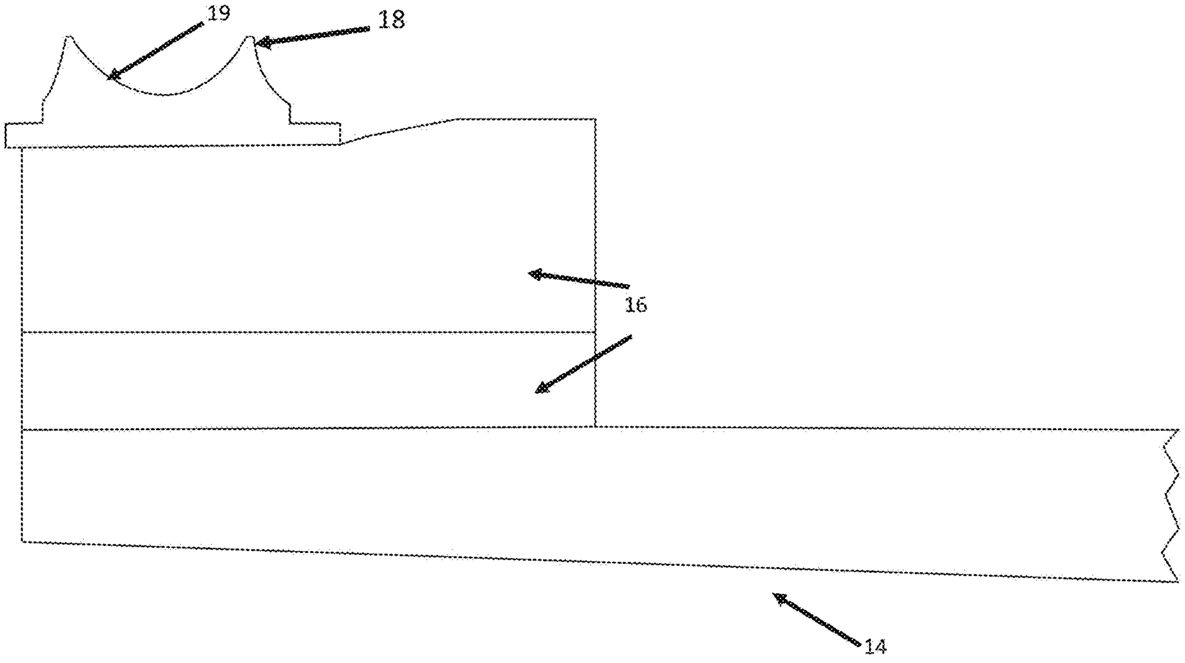
FIG. 3 is a partial side view of a clinch staple mechanism according to embodiments of the disclosure.
Figure 4:
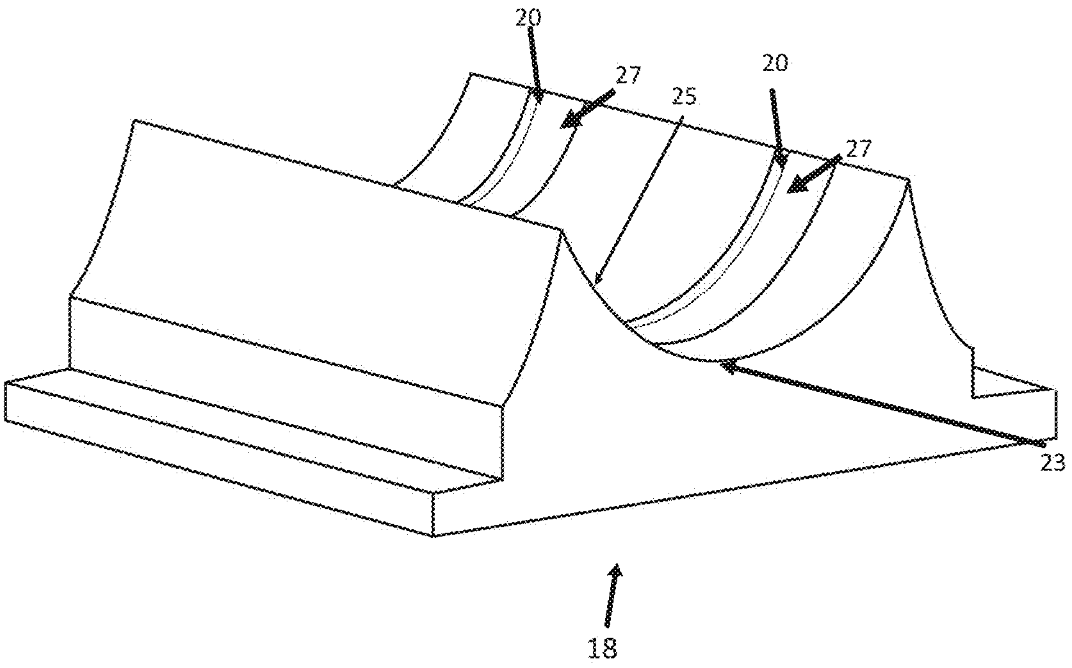
FIG. 4 is a perspective view of a clinch block according to embodiments of the disclosure.
Figure 5:
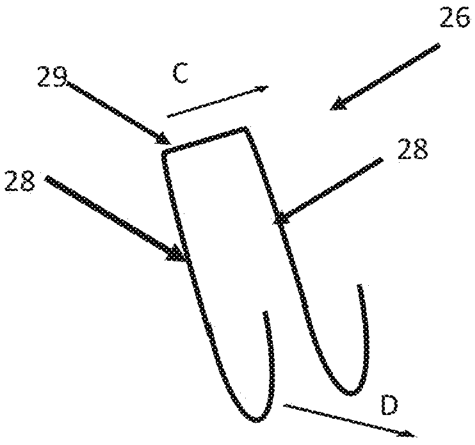
FIG. 5 is a perspective view of a staple clinched by a clinch staple mechanism according to embodiments of the disclosure.
Figure 6:
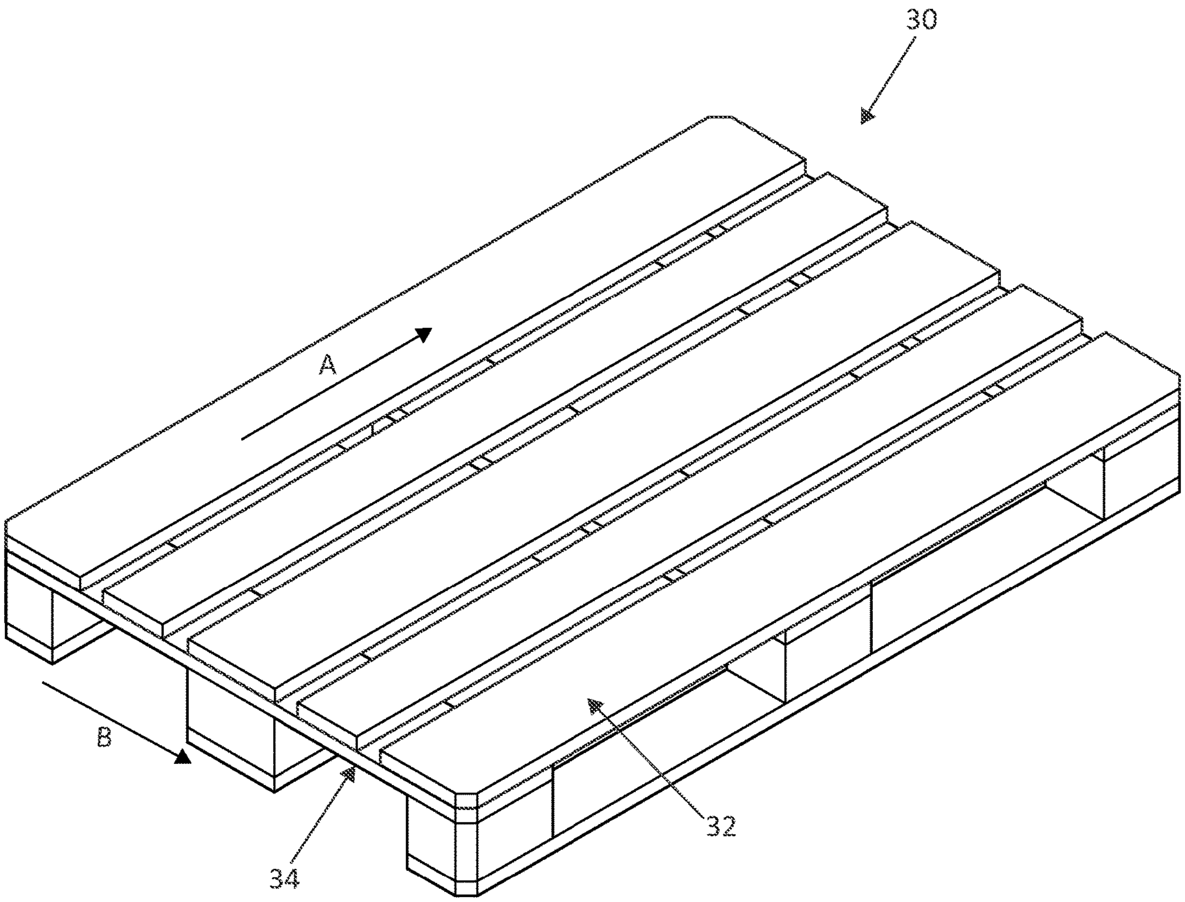
FIG. 6 is a perspective view of deck board and a stringer boards for use with a clinch staple mechanism according to embodiments of the disclosure.

The clinch staple mechanism 10 is used by attaching a pneumatic stapling tool 11 to pivoting base 12 and to an air supply attachment 22 configured for receiving air from the pneumatic stapling tool 11 (FIGS. 2A and 2B). Once the pneumatic stapling tool 11 is attached to pivoting base 12, it is usable, for example, for clinching together wooden deck boards 32 and stringer boards 34 (FIG. 6). The user inserts clinch arm 14 so that clinch block 18 is positioned beneath a top deck board 32 and touching near the underside of a stringer board 34 of a pallet 30 and pneumatic tool 11 is positioned above the top deck board 32. Then the user presses downward on pneumatic stapling tool 11 and pulls the trigger 15 on the pneumatic stapling tool 11. This sends air to air supply attachment 22, which then activates a pivot actuating air cylinder 24, which causes clinch arm 14 to clinch upwards, thereby pressing top deck board 32 together with stringer board 34 at the same time a staple 26 having a crown 29 and a pair of staple legs 28 is dispensed or fired down from the pneumatic stapling tool and through top deck board 32 and stringer board 34. As the staple 26 goes through top deck board 32 and stringer board 34, staple legs 28 of staple 26 pass through top deck board 32 and stringer board 34 and enter staple leg tracks 20 (FIG. 4) on clinch block 18. Clinch block 18 has a curved substantially U-shaped profile 19 configured to face the underside of the wood pieces being clinched such as the underside of stringer board 34. Staple leg tracks 20 follow curved profile 19 so that each staple leg track 20 has a bottom portion 23, a forward curved portion 25 and a rearward curved portion 27. After passing through top deck board 32 and stringer board 34, staple legs 28 will reach the bottom portion 23 of staple leg tracks 20. After the staple legs 28 reach bottom portion 23, they are diverted and bent in the direction of staple leg tracks 20 following either forward curved portion 25 or rearward curved portion 27 of staple tracks 20. For example, as staple legs 28 bend, they bend either forward (away from proximal end 33 of clinch arm 14) or backward (towards proximal end 33 of clinch arm 14) following forward curved portion 25 or rearward curved portion 27 of staple tracks 20 until they curve upwardly and re-enter stringer boards 34 and top deck boards 32 from underneath such that staple legs 28 are not parallel with crown 29. This forward or backward clinching direction adds far greater clinching strength to the deck boards, as it clinches in the direction of wood grain of the wood on both the top deck board and the stringer board underneath. Releasing trigger 15 of pneumatic stapling tool 11 allows for clinch arm 14 to release the wood so the next clinch can be shot on.

Exemplary embodiments disclosed herein allow for the consistent control of the clinch direction, thereby allowing for stronger pullout tension and longer product life of pallet 30 than typical clinch staple mechanisms. According to exemplary embodiments and referring to FIGS. 5 and 6, crown 29 of staple 26 is disposed in crown direction C and perpendicularly traverses the direction A of the wood grain of top deck board 32 and extends in the direction of B of the wood grain of stringer board 34 underneath, and also staple legs 28 are bent in direction D perpendicular to crown direction C and perpendicularly traverse direction B of the wood grain of stringer board 34 underneath and are bent in the direction A of the wood grain of top deck board 32. This clinching format of staple 26 creates a clinch that does not pull back through the wood grain of the wood, but instead it captures both opposing directions of the wood grain in each board 32, 34.

Features of the disclosed embodiments may be combined, rearranged, omitted, etc., within the scope of the invention to produce additional embodiments. Furthermore, certain features may sometimes be used to advantage without a corresponding use of other features.

Many alternatives, modifications, and variations are enabled by the present disclosure. While specific embodiments have been shown and described in detail to illustrate the application of the principles of the invention, it will be understood that the exemplary embodiments may be embodied otherwise without departing from such principles. Accordingly, Applicants intend to embrace all such alternatives, modifications, equivalents, and variations that are within the spirit and scope of the exemplary embodiments.

What is claimed is:

1. A clinch staple mechanism comprising:

a pivoting base configured to be pivotally connected to a pneumatic stapling tool configured to dispense staples each staple having a crown and a pair of staple legs, wherein the crown is disposed in a crown direction;

a clinch arm pivotally connected to the pivoting base at a proximal end of the clinch arm, wherein the clinch arm further comprises a distal end opposite the proximal end of the clinch arm, wherein a forward direction is defined extending away from the proximal end and towards the distal end, and wherein a rearward direction is defined extending away from the distal end and towards the proximal end; and a clinch block disposed on the distal end of the clinch arm, wherein the clinch block is configured to bend the pair of staple legs in a direction perpendicular to the crown direction;

wherein the clinch block has a U-shaped curved profile configured to direct the pair of staple legs in the direction perpendicular to the crown direction, wherein the direction perpendicular to the crown is one of the forward direction and the rearward direction;

wherein the clinch block has a bottom portion, a forward curved portion and a rearward curved portion of the U-shaped curved profile, wherein the forward curved portion extends in the forward direction away from the bottom portion, and wherein the rearward curved portion extends in the rearward direction away from the bottom portion; and wherein the U-shaped curved profile is configured to bend each pair of staple legs following one of the forward curved portion in the forward direction and the rearward curved portion in the rearward direction;

wherein an entire width, in a direction perpendicular to the forward direction or the rearward direction, of the clinch block comprises a U-shaped cross section, and the U-shaped curved profile comprises a pair of parallel staple leg tracks, wherein the pair of staple leg tracks comprise a pair of parallel grooves formed in a surface of the U-shaped curved profile.

2. The clinch staple mechanism of claim 1, wherein each staple leg track has a bottom portion, a forward curved portion and a rearward curved portion of the staple leg track;

wherein each staple leg track is configured to bend each respective staple leg in one of the forward direction and the rearward direction.

3. The clinch staple mechanism of claim 2, wherein the bottom portion of each staple leg track is configured to divert the staple legs into one of the forward curved portion and the rearward curved portion of the staple leg track.

4. The clinch staple mechanism of claim 1, wherein the pneumatic stapling tool and the clinch staple mechanism are configured to clinch together a deck board having a deck board wood grain direction and a stringer board having a stringer board wood grain direction perpendicular to the deck board wood grain direction with the staple having a crown direction in the same direction as the stringer board wood grain direction and pair of staple legs bent in the deck board wood grain direction.

5. The clinch staple mechanism of claim 1, further comprising an air supply attachment configured to be attached to the pneumatic stapling tool and receive air therefrom; and a pivot actuating air cylinder configured to receive air from the air supply attachment and configured to cause pivoting of the distal end of the clinch arm towards the pneumatic stapling tool.

6. A clinch block configured to be disposed on a distal end of a clinch arm, the clinch arm is pivotally connected at a proximal end to a pneumatic stapling tool, wherein a forward direction is defined extending away from the proximal end and towards the distal end, and wherein a rearward direction is defined extending away from the distal end and towards the proximal end, wherein the pneumatic stapling tool is configured to dispense staples each staple comprising a crown and a pair of staple legs, wherein the crown is disposed in a crown direction, wherein the clinch block comprises:

a U-shaped curved profile configured to bend the staple legs in a direction perpendicular to the crown direction, wherein the direction perpendicular to the crown is one of the forward direction and the rearward direction;

wherein the clinch block comprises a bottom portion, a forward curved portion and a rearward curved portion of the U-shaped curved profile, wherein the forward curved portion extends in the forward direction away from the bottom portion, and wherein the rearward curved portion extends in the rearward direction away from the bottom portion; and wherein the U-shaped curved profile is configured to bend each pair of staple legs following one of the forward curved portion in the forward direction and the rearward curved portion in the rearward direction;

wherein an entire width, in a width direction perpendicular to the forward direction or the rearward direction, of the clinch block comprises a U-shaped cross section, and the U-shaped curved profile comprises a pair of parallel staple leg tracks, wherein a thickness of the clinch block, in a thickness direction, increases from the bottom portion to the forward curved portion along the forward direction and increases from the bottom portion to the rearward curved portion along the rearward direction, wherein the thickness direction is perpendicular to the width direction and the forward direction or the rearward direction;

wherein the pair of staple leg tracks comprise a pair of parallel grooves formed in a surface of the U-shaped curved profile.

7. The clinch block of claim 6, wherein each staple leg track has a bottom portion, a forward curved portion and a rearward curved portion of the staple leg track;

wherein each staple leg track is configured to bend each respective staple leg in one of the forward direction and the rearward direction.

8. The clinch block of claim 7, wherein the bottom portion of each staple leg track is configured to divert the staple legs into one of the forward curved portion and the rearward curved portion.

* * * * *